United States Patent
Okano (10) Patent No.: US 7,027,978 B2
(45) Date of Patent: Apr. 11, 2006

(54) VOICE RECORDING AND REPRODUCING APPARATUS, INFORMATION PROCESSING APPARATUS, AND RECORDING MEDIUM HAVING RECORDED AN INFORMATION PROCESSING PROGRAM

(75) Inventor: Hideo Okano, Hanno (JP)

(73) Assignee: Olympus Optical Co., Ltd., Tokyo (JP)

( * ) Notice: Subject to any disclaimer, the term of this patent is extended or adjusted under 35 U.S.C. 154(b) by 414 days.

(21) Appl. No.: 09/771,542

(22) Filed: Jan. 29, 2001

(65) Prior Publication Data

US 2001/0011219 A1 Aug. 2, 2001

(30) Foreign Application Priority Data

Jan. 31, 2000 (JP) ............................... 2000-022752

(51) Int. Cl.
*G10L 19/00* (2006.01)
*G06F 13/20* (2006.01)

(52) U.S. Cl. ................... 704/201; 710/313; 369/33.01; 704/270

(58) Field of Classification Search ................ 704/258, 704/260, 275, 207, 270, 500, 270.1, 278, 704/201; 380/201; 386/46, 112; 395/2.84; 364/419.07; 710/313; 369/33.01
See application file for complete search history.

(56) References Cited

U.S. PATENT DOCUMENTS

| 5,369,573 | A | * | 11/1994 | Holloran et al. ............. 715/531 |
| 5,583,965 | A | * | 12/1996 | Douma et al. ............... 704/275 |
| 5,887,193 | A | * | 3/1999 | Takahashi et al. ............. 710/8 |
| 5,903,871 | A | * | 5/1999 | Terui et al. .................. 704/500 |
| 5,974,005 | A | * | 10/1999 | Kato ........................ 369/25.01 |
| 6,009,433 | A | * | 12/1999 | Kurano et al. .............. 707/100 |
| 6,118,871 | A | * | 9/2000 | Okuyama et al. ........... 380/201 |
| 6,473,797 | B1 | * | 10/2002 | Hirasawa .................... 709/224 |
| 6,516,135 | B1 | * | 2/2003 | Higuchi et al. ............. 386/112 |
| 6,611,652 | B1 | * | 8/2003 | Iwamoto et al. ............. 386/46 |
| 6,741,964 | B1 | * | 5/2004 | Okano ........................ 704/270 |

FOREIGN PATENT DOCUMENTS

JP 2001014264 A * 1/2001

OTHER PUBLICATIONS

IEEE, The Authoritative Dictionary of IEEE Standards Terms 2000, IEE, 7th edition.*

* cited by examiner

*Primary Examiner*—W. R. Young
*Assistant Examiner*—James S. Wozniak
(74) *Attorney, Agent, or Firm*—Frishauf, Holtz, Goodman & Chick, P.C.

(57) ABSTRACT

A system control portion of a voice data recording and reproducing apparatus converts inputted voice signals into digitized voice data, adds header information stored in a table composed of a rewritable nonvolatile storage medium to the converted voice data and records them in a semiconductor memory as a recording medium. A PC to which such a voice data recording and reproducing apparatus can be connected acquires header information stored in the data table, and, when the changing of the header information is designated, sends the changed header information to the voice data recording and reproducing apparatus. Based upon the sent header information, the system control portion of the voice recording and reproducing apparatus rewrites the header information in the data table.

11 Claims, 4 Drawing Sheets

FIG. 1

| ITEM NAME | FIELD | NUMBER OF ITEMS | NUMBER OF REQUIRED BYTES |
|---|---|---|---|
| AUTHOR ID | 16 | 10 | 160 |
| WORK TYPE ID | 16 | 10 | 160 |
| OPTION ITEM NAME | 8 | 1 | 8 |
| OPTION ITEM ID | 20 | 1 | 20 |

FIG. 2

| DEFINITION | FIELD |
|---|---|
| AUTHOR ENTRY NUMBER | 1 |
| AUTHOR ID1 | 16 |
| AUTHOR ID2 | 16 |
| ⋮ | ⋮ |
| AUTHOR ID10 | 16 |
| WORK TYPE ENTRY NUMBER | 1 |
| WORK TYPE ID1 | 16 |
| WORK TYPE ID2 | 16 |
| ⋮ | ⋮ |
| WORK TYPE ID10 | 16 |
| OPTION ITEM NAME | 8 |

FIG. 7

|  | DEFINITION |
|---|---|
| 1 | FILE CONTROL CODE |
| 2 | LICENSE CODE |
| 3 | AUTHOR ID |
| 4 | JOB NUMBER |
| 5 | FILE TYPE |
| 6 | WORKING CONDITION |
| 7 | HANDLING CONDITION OF FILE |
| 8 | RECORDING COMPLETION DATE |
| 9 | RECORDING COMPLETION TIME |
| 10 | RECORDING TIME |
| 11 | SYSTEM HANDLING FLAG INFORMATION |
| 12 | PRIORITY LEVEL INFORMATION |
| 13 | TYPIST INFORMATION |
| 14 | INDEX MARK NO.1 TO 16 |
| 15 | RESERVATION NUMBER |
| 16 | EXTENDED RECORDING TIME |
| 17 | EXTENDED INDEX MARK NO.1 TO 16 |
| 18 | SOUND QUALITY INFORMATION |
| 19 | (RESERVATION) |
| 20 | WORK CLASSIFICATION CODE |
| 21 | OPTION 1 CODE NAME |
| 22 | OPTION 1 CODE |
| 23 | OPTION 2 CODE NAME |
| 24 | OPTION 2 CODE |
| 25 | OPTION 3 CODE NAME |
| 26 | OPTION 3 CODE |
| 27 | WORKING CONDITION INFORMATION |
| 28 | PRIORITY |
| 29 | REPRODUCING POSITION |
| 30 | TEXT RETENTION |
| 31 | RESERVATION |

VOICE RECORDING AND REPRODUCING APPARATUS, INFORMATION PROCESSING APPARATUS, AND RECORDING MEDIUM HAVING RECORDED AN INFORMATION PROCESSING PROGRAM

CROSS-REFERENCE TO THE RELATED APPLICATIONS

This application is based upon and claims the benefit of priority from the prior Japanese Patent Application No. 2000-022752, filed Jan. 31, 2000, the entire contents of which are incorporated herein by reference.

BACKGROUND OF THE INVENTION

The present invention relates to a voice recording and reproducing apparatus digitizing inputted voice and recording them in a recording medium, an information processing apparatus being connectable to such a voice recording and reproducing apparatus, and a recording medium having recorded an information processing program causing a computer to function as such an information processing apparatus.

Generally, the voice recording and reproducing apparatus, that is, the tape recorder has an application in dictation recording. In this dictation recording the tape recorder is used in various ways, for example, the content of a letter to be sent is recorded on an audio tape by a tape recorder, this audio tape is delivered to a secretary or the like, and this secretary or the like plays back the tape, listens to the voice and types the letter, or the content of a meeting is recorded and subsequently minutes of the meeting are taken by playing back the tape and listening to the recorded content.

And in recent years, in the voice recording and reproducing apparatus, due to demand for a miniaturized apparatus there have been developed apparatus using a semiconductor memory instead of a magnetic tape as a recording medium.

Among such voice recording and reproducing apparatus recording voice data in the semiconductor memory, there are some having a composition in which the semiconductor memory cannot be detached from the main body of the apparatus. In such an apparatus, when desiring to deliver recorded voice data to a secretary or the like and to have a document typed, that is, when desiring to use voice data recorded in this semiconductor memory in an external apparatus such as a voice reproducing apparatus other than the concerned apparatus, the voice data is transmitted to the external apparatus via a cable connected between both apparatuses.

Here, since personal computers (PCs) are widely applied recently, documents are usually typed by a word processor operating on this PC. Generally this PC is equipped with a sound function and is capable of reproducing and outputting voice data by a speaker connected thereto. Therefore, a method of transmitting recorded data from the voice data recording and reproducing apparatus to the PC and type-inputting the voice data by a word processor with reproducing them on the PC is now used.

And recently, PCs having employed an interface specification permitting connection of many devices called USB (Universal Serial Bus) based upon a so-called Plug and Play function are widely applied.

By the way, in a voice recording and reproducing apparatus using a semiconductor memory as described above as a recording medium, when voice data are recorded, they are recorded in the semiconductor memory as a voice data file to which header information has been added. This header information includes many kinds of information such as information for identifying the recorder of the voice data and the typist, recording mode, recording date or the like.

With respect to information which the operator can set optionally among this header information, since the voice recording and reproducing apparatus is provided with only several operating buttons, it is required to select and designate such information from a hierarchically structured menu, what is very complicated and is liable to lead to operational failures.

BRIEF SUMMARY OF THE INVENTION

The present invention has been made in consideration of the above-described circumstances and has an object of providing a voice recording and reproducing apparatus being capable of setting each information of the voice recording and reproducing apparatus by enabling the information processing apparatus such as a PC or the like to set each information, an information processing apparatus, and a recording medium having recorded an information processing program.

According to a first aspect of the present invention, there is provided a voice recording and reproducing apparatus, comprising:

conversion means for converting inputted voice signals into digitized voice data;

header information storage means for storing header information;

recording means for adding header information stored in the header information storage means to the voice data converted by the conversion means and for recording the voice data in voice data recording means; and changing means for communicating with an external apparatus and for changing header information stored in the header information storage means based upon information sent from the external apparatus.

According to a second aspect of the present invention, there is provided an information processing apparatus connectable to a voice recording and reproducing apparatus for digitizing and recording inputted voice signals in a recording medium, comprising:

inherent information acquisition means for acquiring the inherent information of the voice recording and reproducing apparatus; and control means for carrying out controls in accordance with the inherent information acquired by the inherent information acquisition means so that at least one of the control program and the control data of the voice recording and reproducing apparatus may be changed.

According to a third aspect of the present invention, there is provided a recording medium having recorded an information processing program, the information processing program comprising:

a processing program for causing a computer connectable to a voice recording and reproducing apparatus digitizing inputted voice signals and recording in a recording medium to acquire the inherent information of the voice recording and reproducing apparatus; and a processing program for changing at least one of the control program and the control data of the voice recording and reproducing apparatus according to the inherent information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Now, referring to the drawing, one embodiment of the present invention will be described.

Figure 1:
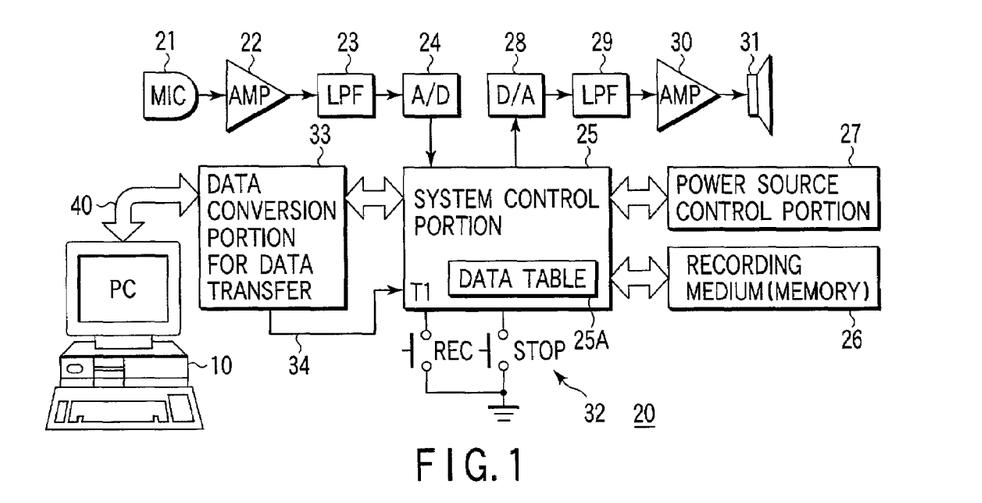
FIG. 1 is a view showing the composition of one embodiment of the present invention.

In FIG. 1, one embodiment of an information processing apparatus to which a plurality of voice recording and reproducing apparatus are connectable and which can exchange data with the voice recording and reproducing apparatus, a personal computer (PC) 10 is shown. Further, one embodiment of one of the voice recording and reproducing apparatus composed as a plurality of USB device connected to the PC 10, a voice data recording and reproducing apparatus 20 is shown.

Here, in the voice data recording and reproducing apparatus 20, a microphone (MIC) 21 is connected to a system control portion 25 via an amplifier (AMP) 22, a low-pass filter (LPF) and an analog/digital converter 24.

Although not shown in particular, this system control portion 25 contains a digital signal processing portion (DSP) as an encoding/decoding circuit for compressing/expanding voice data and a CPU for controlling each portion of the voice data recording and reproducing apparatus 20. Further, this system control portion 25 contains a data table 25A composed of a rewritable nonvolatile recording medium such as an EEPROM having stored various information such as a type name for identifying the voice data recording and reproducing apparatus and header information as described below.

To this system control portion 25 a nonvolatile semiconductor memory 26 as a recording medium for recording voice data and a power source control portion 27 are connected. Moreover, to this system control portion 25 a speaker 31 is connected via a digital/analog (D/A) converter 28, a LFP 29 and a power AMP 30.

Further, to this system control portion 25 a operational input portion 32 is connected. Although not shown in particular, operational input portion 32 includes a playback button, a fast-forward button, a rewind button, an Imark button, an Emark button, an endless recording switching button or the like in addition to the record button REC and the stop button STOP.

Here, the I-mark and the E-mark are as described below. That is, since a plurality of voice data are recorded in the semiconductor memory 26, in this kind of voice data recording and reproducing apparatus, a recorder can record an instruction (I) mark showing priority relations among a plurality of voice data recorded in the semiconductor memory 26, that is, an index mark for giving instructions to a typist or secretary, by operating the I-mark button in recording voice data. Accordingly, the recorder can instruct priority relations concretely by voice by using this I-mark. Moreover, the recorder can record an index mark called an end (E) mark by operating the E-mark button in order to show punctuations among a plurality of voice data.

Moreover, to the system control portion 25 a data conversion portion for data transfer 33 is connected in order to communicate with the PC 10 via an USE cable 40. This data conversion portion for data transfer 33 constitutes a means for receiving data from external apparatus such as a PC or the like, a means for sending a connection confirmation completion signal to external apparatus and a means for sending data. Moreover, the data conversion portion for data transfer 33 supplies a connection confirmation completion signal 34 to a terminal T1 of the system control portion 25 when the USB cable 40 has been connected.

That is, in the voice data recording and reproducing apparatus 20, analog signals obtained from the MIC 21 are amplified by the AMP 22 and passed through the LPF 23, and subsequently, they are converted into digital signals by the A/D converter 24, inputted into the system control portion 25 and are encoded, and these encoded voice data are recorded in the semiconductor memory 26. At this time, header information recorded in the data table 25A is added to voice data, and the voice data are recorded as a voice file.

Moreover, voice data recorded in the semiconductor memory 26 are read out and decoded by the system control portion 25, and these decoded read-out data are inputted into the D/A converter 28 and converted into analog signals via the LPF 29. And the signals outputted from this LPF 29 are amplified by the power AMP 30 and outputted outside from the speaker 30 as sounds.

Further, the voice data recorded in the semiconductor memory 26 is read out by the system control portion 25, inputted into the data conversion portion for data transfer 33 and transferred to the PC 10 via the USB cable 40.

Figure 2:
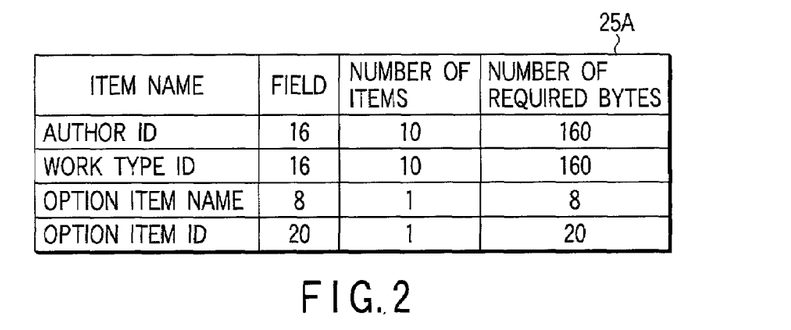
FIG. 2 is a view showing the content of header information stored in the data table.

FIG. 2 is a view showing the content of header information stored in the data table 25A. That is, this data table 25A stores "Author ID", "Work Type ID", "Option Item name", "Option Item ID" or the like.

Here, the "Author ID" is the ID or real name of an dictating user, and 10 items of data consisting of 16 bytes respectively can be registered in alphanumeric characters. Moreover, the "Work Type ID" is the ID or real name of a job, and 10 items of data consisting of 16 bytes respectively can be registered in alphanumeric characters. "Option Item name" is the name of an item displayed on a display portion (not shown) of the voice data recording and reproducing apparatus 20 as a menu, and one item of data consisting of 8 bytes is registered in alphanumeric characters. And the "Option Item ID" is the ID of an item which is different in each company, and one item of data consisting of 20 bytes is registered in alphanumeric characters.

For example, if used in a hospital, the "Author ID" will be allocated to the name of a doctor, the "Work Type ID" to the name of a department such as internal department, and the "Option Item ID" to the health insurance number or the like.

Figure 3:
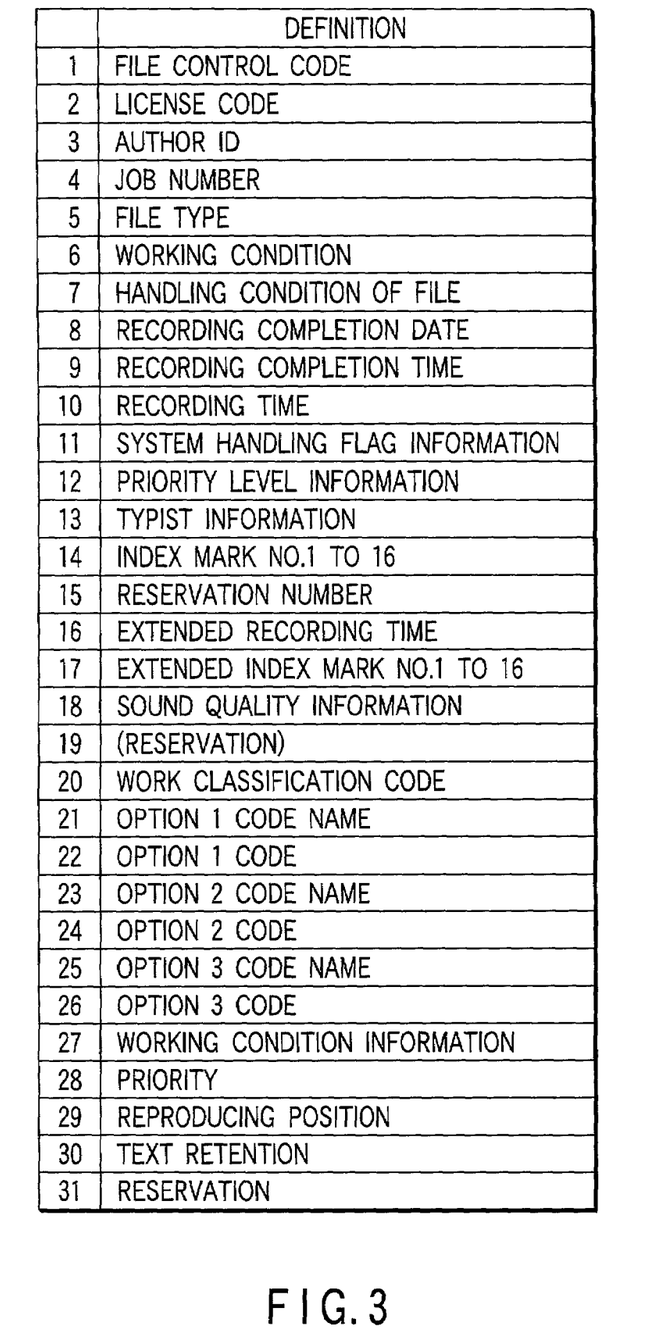
FIG. 3 is a view showing the content of data recorded in the header portion of the voice data file.

Moreover, as described above, the header information recorded in the data table 25A is added to the voice data corresponding to the voice inputted from the MIC 21, and these voice data are recorded as a voice data file in the semiconductor memory 26. Here, the header portion of the voice data file includes, as shown in FIG. 3, various data set by the user or automatically. Further, in the same figure, the "INDEX mark" corresponds to the I-mark, and the "Extended INDEX mark" corresponds to the E-mark. Moreover, the "Work Classification code" corresponds to the "Work Type ID". Before being written in the file, these data are stored suitably in the data table 25A.

Now, the operations of the PC 10 to which a plurality of voice data recording and reproducing apparatus 20 having the above-described structure can be connected will be described.

Figure 4:
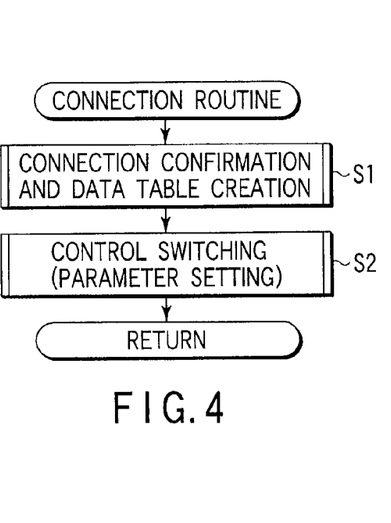
FIG. 4 is a flowchart of a connection routine executed in the PC.

That is, in the PC 10, when the control program of this voice data recording and reproducing apparatus 20 is started, initial settings such as settings of screen display, each parameter or the like are made. In these initial settings, for setting each parameter, a connection routine as shown in FIG. 4 is executed. That is, in this connection routine, first, a connection confirmation and data table creating subroutine is called (Step S1). More specifically, this subroutine is to identify all USB devices connected to the PC 10 and to create a data table showing the USB devices connected to the PC 10. And subsequently, based upon the data table created by means of this subroutine and stored in a RAM (not shown), a control switching (parameter setting) subroutine for the voice data recording and reproducing apparatus 20 which is a desired USB device is called (Step S2).

Figure 5:
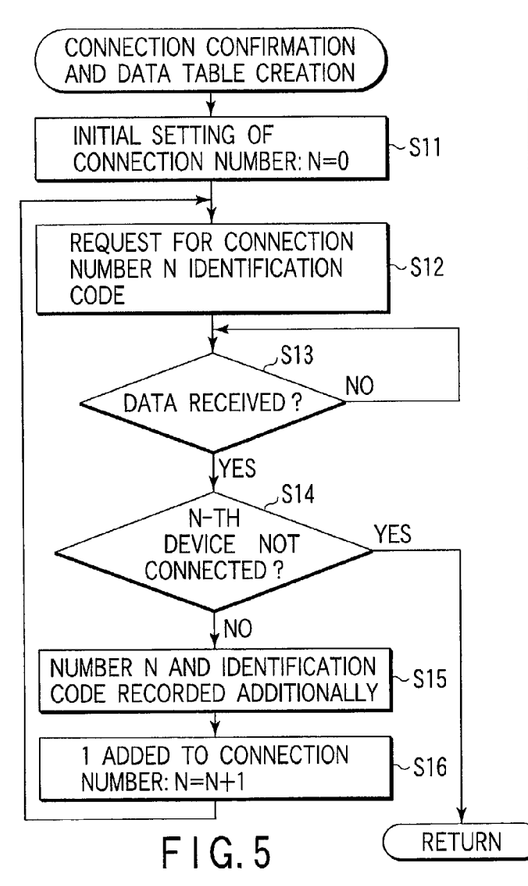
FIG. 5 is a flowchart of a connection confirmation and data table creation subroutine.

Here, the connection confirmation and data table creating subroutine in the Step S1 is as shown in FIG. 5. That is, first as the initial setting of a connection number, the internal counter N (not shown) is reset to "0" (Step S11). And subsequently, a request for identification code transfer is sent to the USB device having a connection number N shown in this counter N (Step S12). And, for a predetermined period of time, the system waits to receive data (identification code) (Step S13). Here, it is judged if the N-th USB device is connected accordingly as the data have been received or not (Step S14), and if it is not connected, this connection confirmation and data table creating subroutine is terminated and the procedure returns to an upper connection routine.

On the other hand, when it is judged that the N-th USB device is connected, this connection number (number N) and the received identification code are recorded additionally in a data table created in the RAM (not shown) in the PC 10 (Step S15). Here, the identification code includes, for example, the model name information of the USB device (the connected device type, that is, the device type name) and the user ID information (ID number, that is, the "Author ID"). And "1" is added to the connection number N shown in the counter N (Step S16), the procedure returns to the Step S12, and the request for identification code transfer is sent to the next USB device.

By repeating the Steps S12 to S16, the list of all the connected USB device is created as a data table and stored in the RAM (not shown).

Further, in this embodiment, it is assumed that a connection number is allocated automatically from "0" sequentially to the devices connected to the PC 10.

Figure 6:
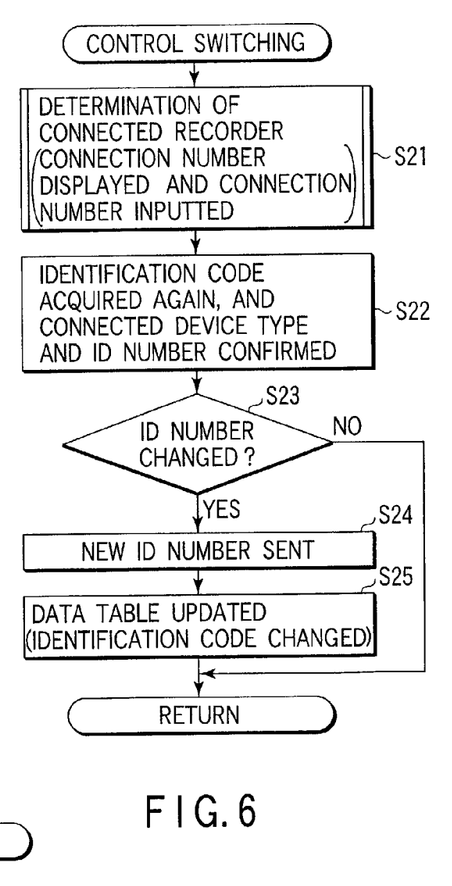
FIG. 6 is a flowchart of a control switching (parameter setting) subroutine in FIG. 4.

Moreover, the control switching (parameter setting) subroutine in the Step S2 is as shown in FIG. 6. That is, first, the determination of the connected recorder is processed (Step 21). In this processing, by displaying the list of all the USB device connected to the PC 10 recorded in the data table, that is, the list of the connection numbers, on the monitor and by receiving a connection number inputted by the operator, a voice data recording and reproducing apparatus (recorder) 20 which is an USB device desired by the operator is selected.

And subsequently, a recorder identification code is acquired again from the device having the connection number selected and inputted by the operator, is compared with the corresponding recorder identification code (connected device type and ID number) recorded in the data table and is confirmed (Step S22). In the connection confirmation and data table creating subroutine, the connection-confirmed USB device may be disconnected or added lastly while it is being confirmed if USB device to be connected later than the connection-confirmed USB device are connected, and therefore, this Step S22 is executed for confirming again if the connection-confirmed USB device is connected.

Next, it is judged if the operator of the PC 10 has carried out an operation for changing the ID number, that is, the "Author ID", in the USB device, in this case, in the voice data recording and reproducing apparatus 20 (Step S23). Here, if the operation for changing the ID number is not carried out, this control switching subroutine is terminated and the procedure returns to an upper connection routine.

On the other hand, if the operation for changing the ID number is carried out, a request for data table change is sent to the voice data recording and reproducing apparatus 20, and a new ID number set by the operator is sent (Step S24). And, after the data table stored in the RAM (not shown) has been updated, that is, the identification code has been changed (Step S25), this control switching subroutine is terminated and the procedure returns to an upper connection routine.

Further, for simplification, this control switching subroutine shows a processing for changing the ID number only as a representative example, and it is without saying that various data of the voice data recording and reproducing apparatus 20 such as the "Work Type ID" or the like are also changed in this subroutine.

Figure 7:
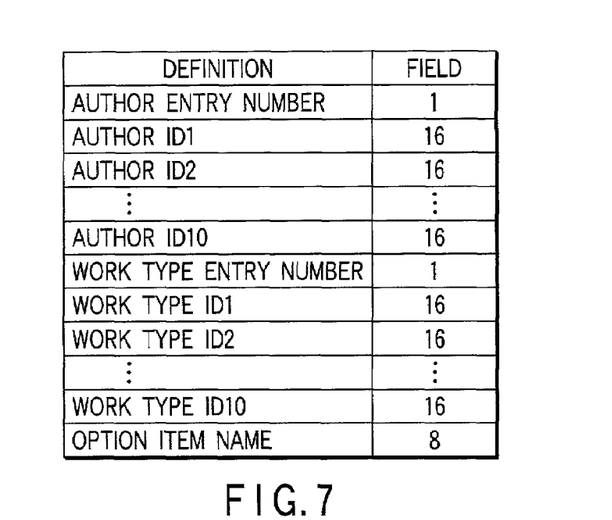
FIG. 7 is a view showing the content of data transferred from the PC to the voice data recording and reproducing apparatus.

For example, data as shown in FIG. 7 are transferred from the PC 10 to the voice data recording and reproducing apparatus 20, and the data in the data table 25A can be updated. That is, here, "Author Entry Number" is the number of the registered "Author ID", and "Author IDn" is a 16-digit value of the n-th "Author ID". "Work Type Entry Number" is the number of the registered "Work Type ID", and "Work Type IDn" is a 16-digit value of the n-th "Work Type ID". And "Option Item Name" is a 16-digit item name.

Moreover, the operator not only specifies, as in the Step S23, the transfer of these data optionally, but naturally these data may be also transferred automatically at the beginning of connection, thereby updating the data in the data table 25A.

After completion of the initial settings, in the PC 10, when the main screen for controlling the voice data recording and reproducing apparatus 20 is displayed on the monitor and a file transfer processing is instructed by mouse or keyboard input, the specified file is received from the voice recording and reproducing apparatus 20 via an USB cable 40. And, when file reproduction is instructed, a file reproduction command is sent to the voice data recording and reproducing apparatus 20, and the specified file is reproduced in the voice data recording and reproducing apparatus 20. When recorder-recorded information confirmation is instructed, a number of records confirmation command is sent to the voice data recording and reproducing apparatus 20, and the number of records recorded in the semiconductor memory 26 and sent back from the voice data recording and reproducing apparatus 20 corresponding thereto is displayed on the monitor. Moreover, when PC time setting is instructed, a time setting command (including time data measured by a clock built in the PC) is sent to the voice data recording and reproducing apparatus 20, and the built-in clock is thereby synchronized with the PC time in the voice data recording and reproducing apparatus 20. When a recording processing is instructed, a recording processing command is sent to the voice data recording and reproducing apparatus 20, and voice data are thereby recorded in the semiconductor memory in the voice data recording and reproducing apparatus 20. And, when the termination of this control program is instructed, a command for switching the power source of the voice data recording and reproducing apparatus 20 to low power is sent to the voice data recording and reproducing apparatus 20, and the voice data recording and reproducing apparatus 20 is thereby shifted to power-saving mode. Like this, the voice data recording and reproducing apparatus 20 can be controlled from the PC 10.

Figure 8:
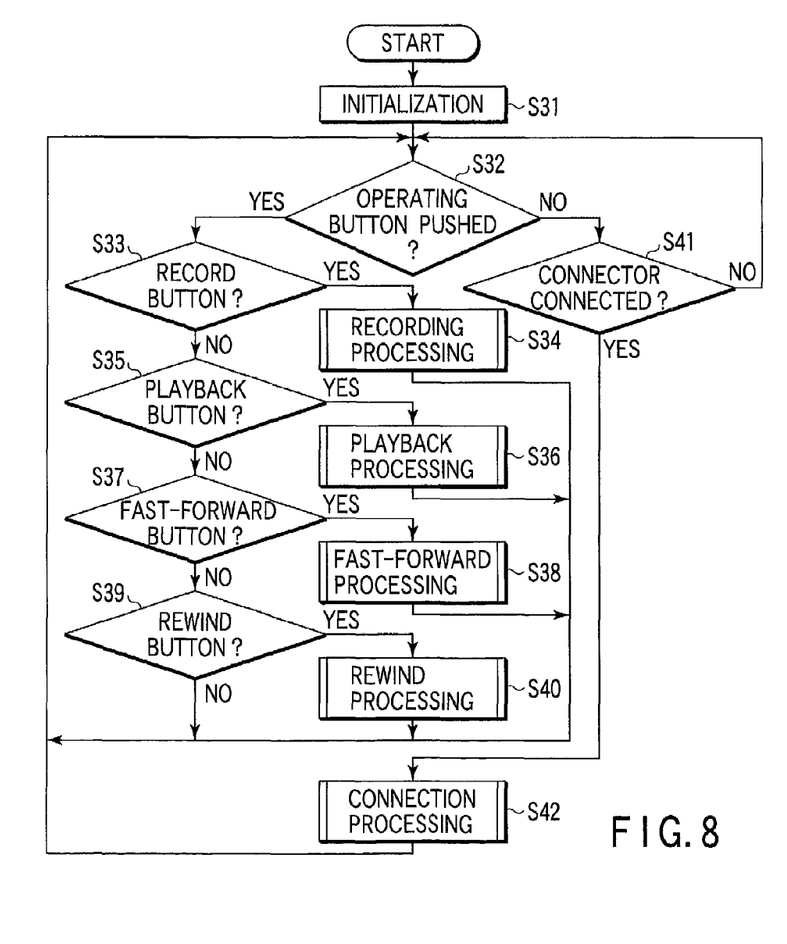
FIG. 8 is a flowchart of a main routine executed in the system control portion of the voice data recording and reproducing apparatus.

On the other hand, in the voice data recording and reproducing apparatus 20, the system control portion 25 operates like a main routine shown in FIG. 8.

That is, corresponding to the throw-in of the power source switch (not shown), an internal work memory, a register or the like (not shown) are first initialized (Step S31), and subsequently, it is judged whether any operating button of the operational input portion 32 has been operated or not (Step S32). And, when the record button REC is pushed (Step S33), the recording processing is executed (Step S34). When the playback button (not shown) is pushed (Step S35), a playback processing is executed (Step S36). Moreover, when the fast-forward button (not shown) is pushed (Step S37), a fast-forward processing is executed (Step S33). When the rewind button (not shown) is pushed (Step S39), a rewind processing is executed (Step S40) Since these recording processing, play back processing, fast-forward processing and rewind processing are the same as the conventional ones, the details thereof are omitted here.

Figure 9:
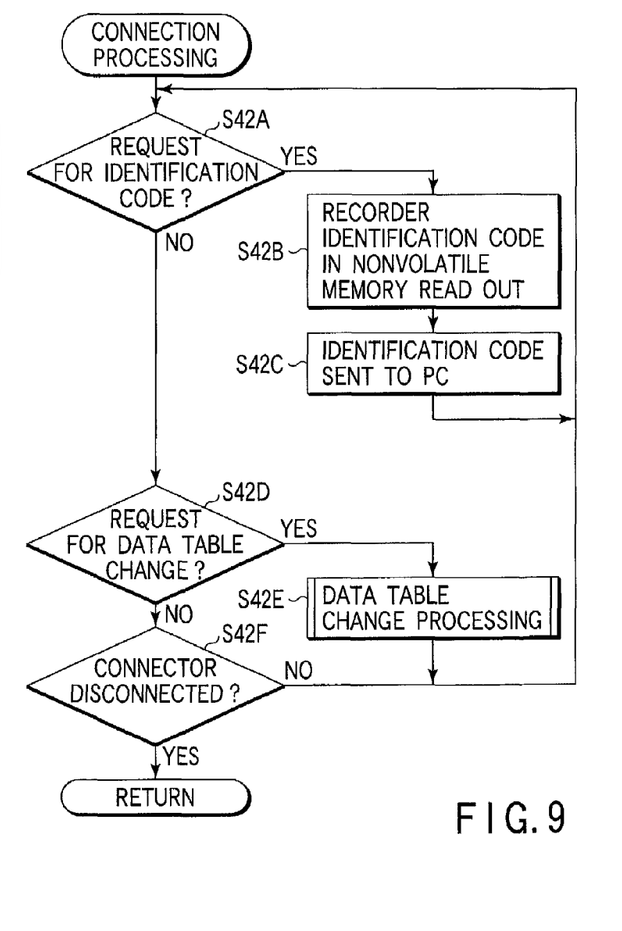
FIG. 9 is a flowchart of a connection processing subroutine in FIG. 8.

This subroutine is executed as shown in FIG. 9. That is, first, it is judged whether there is a request for identification code transfer from the PC 10 or not (Step S42A). When the request for identification code transfer is received by the data conversion portion for data transfer 33 from the PC 10 via the USB cable 40 due to the processing in the Step S12, the judgment in this Step S42A becomes "YES". In this case, the system control portion 25 reads out a recorder identification code including the device type name, the "Author ID" or the like stored in the data table 25A in the system control portion 25 (Step S42B). And, after this readout recorder identification code has been transferred to the PC 10 (Step S42C), the procedure returns to the Step S42A.

On the other hand, when it is judged in the Step S42A that there is no request for identification code transfer, it is further judged whether there is a request for data table change or not (Step S42D). When the request for data table change is sent from the PC 10 via the USB cable 40 as in the processing in the Step S24, it is received by the data conversion portion for data transfer 33, and the judgment in this Step S42D becomes "YES". In this case, the system control portion 25 executes a data table change processing (Step S42E). The details of this data table change processing are omitted here, but in this processing data sent after the request for data table change are received and the data table 25A is updated. Accordingly, this system control portion 25 functions as a changing means. And, after completion of this data table change processing, the procedure returns to the Step S42A.

On the other hand, when no request for data table change has been received in the Step S42D, it is judged whether there is a request for remote control of the voice data recording and reproducing apparatus 20 from the PC 10 including voice recording, reproduction or the like as described above or not, and a processing corresponding thereto is executed. However, since this is not a characteristic part of the present invention, the illustration and description thereof are omitted.

And, when there are no control signals from the PC 10, it is further judged whether the connector is disconnected or not (Step S42F). And, when the connector is not disconnected, the procedure returns to the Step S42A, and when the connector is disconnected, the procedure returns to an upper main routine.

As described above, in this embodiment, when a plurality of voice data recording and reproducing apparatus 20 being capable of transferring a recorder identification code including device type name and ID number to the PC 10 are connected, the concerned voice data recording and reproducing apparatus 20 is identified by the recorder identification code, and subsequently, the recorder identification code and the header information of the voice file can be updated.

Although the present invention has been described in one embodiment, it is to be understood that the present invention is not limited to the above-described one embodiment and that various modifications and applications may be made without departing from the scope of the summary of the present invention.

For example, having described the present invention as related to a voice data recording and reproducing apparatus recording and reproducing voice data as a voice recording and reproducing apparatus connected to an information processing apparatus, it is without saying that the present invention may be applied to apparatus recording and reproducing other data such as image data or the like. Moreover, it has been described that both apparatus are connected with each other by USE, however, the connection of both apparatus is not limited thereto.

Further, in the above-described one embodiment, the data table 25A of the voice data recording and reproducing apparatus 20 is updated, however, it is without saying that the header information of the voice file stored in the semiconductor memory 26 may be changed.

Moreover, it is also possible to rewrite the control program of the system control portion 25 of the voice data recording and reproducing apparatus 20 from the PC 10.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus for which a plurality of external data recording and reproducing apparatuses for digitizing, and recording inputted signals in a recording medium are connectable, comprising:
connection number allocation means for, after connecting the external data recording and reproducing apparatuses to the information processing apparatus, allocating a connection number to each of the connected external data recording and reproducing apparatuses;
identification code acquisition means for acquiring an identification code of the external data recording and reproducing apparatuses connected to the information processing apparatus;
storage means for storing each connection number allocated by the connection number allocation means and the identification code acquired by the identification code acquisition means;
display means for displaying at least one of the connection number and the identification code stored in the storage means;
first selection means for selecting at least one of a desired connection number and a desired identification code, from at least one of the connection number and the identification code displayed by the display means;
second selection means for selecting a desired external data recording and reproducing apparatus from the connected plurality of external data recording and reproducing apparatuses based on the selection by the first selection means; and
control means for carrying out controls so that at least one of a control program and control data of said external data recording and reproducing apparatus selected by the second selection means may be changed.

2. The apparatus according to claim 1, wherein the control means carries out controls so that the data table stored in the external data recording and reproducing apparatus may be changed, and
the data table stores a plurality of ID data that a user can select on the data recording and reproducing apparatus, for predetermined ID items, and when the external data recording and reproducing apparatus records data the ID data selected by the user, of the plurality of ID data, is recorded as header information.

3. The apparatus according to claim 2, wherein
said control means can change at least one of ID data identifying a user, ID data identifying a work type, option item data and an option item name, which are stored in the data table.

4. The apparatus according to claim 1, wherein when changing said at least one of the control program and the control data, the control means causes the identification code acquisition means to acquire the identification code of the external data recording and reproducing apparatus again, and the control means determines whether the acquired identification code of the external data recording and reproducing apparatus is identical to the identification code of the external data recording and reproducing apparatus selected by the second selection means.

5. A recording medium having recorded an information processing program for which a plurality of external data recording and reproducing apparatuses for digitizing and recording inputted signals are responsive, the information processing program comprising:
a processing program for, after connecting the external data recording and reproducing apparatuses to the information processing apparatus, allocating a connection number to each of the plurality of connected external data recording and reproducing apparatuses;
a processing program for acquiring an identification code of the external data recording and reproducing apparatuses which are responsive to the information processing program;
a processing program for storing each allocated connection number and each acquired identification code;
a processing program for displaying at least one of the stored connection number and the stored identification code;
a processing program for selecting at least one of a desired connection number and a desired identification code, from at least one of the displayed connection number and the displayed identification code;
a processing program for selecting a desired external data recording and reproducing apparatus from the plurality of external data recording and reproducing apparatuses based on the selected and displayed connection number and identification code; and
a processing program for carrying out controls so that at least one of a control program and control data of the selected external data recording and reproducing apparatus may be changed.

6. The recording medium according to claim 5, wherein the processing program for carrying out controls carries out controls so that the data table may be changed, and
the data table stores a plurality of ID data that a user can select, for predetermined ID items, and when the data is recorded, the ID data selected by the user, of the plurality of ID data, is recorded as header information.

7. The recording medium according to claim 5, wherein when changing said at least one of the control program and the control data, the processing program for carrying out controls causes the processing program for acquiring an identification code to acquire the identification code of the external data recording and reproducing apparatus, and the processing program for carrying out controls determines whether the acquired identification code of the external data recording and reproducing apparatus is identical to the stored identification code of the desired data recording and reproducing apparatus selected by the second selection means.

8. An information processing apparatus for which a plurality of external data recording and reproducing apparatuses for digitizing and recording inputted signals in a recording medium are connectable, comprising:
a connection number allocation circuit which, after connecting the external data recording and reproducing apparatuses to the information processing apparatus, allocates a connection number to each of the connected external data recording and reproducing apparatuses;
an identification code acquisition circuit which acquires an identification code of the external data recording and reproducing apparatuses connected to the information processing apparatus;
a memory which stores each connection number allocated by the connection number allocation circuit and the identification code acquired by the identification code acquisition circuit;
a display unit which displays at least one of the connection number and the identification code stored in the memory;
a first selection circuit which selects at least one of a desired connection number and a desired identification code, from at least one of the connection number and the identification code displayed by the display unit;
a second selection circuit which selects a desired external data recording and reproducing apparatus from the connected plurality of external data recording and reproducing apparatuses based on the selection by the first selection circuit; and a control circuit which carries out controls so that at least one of a control program and control data of the external data recording and reproducing apparatus selected by the second selection circuit may be changed.

9. The apparatus according to claim 8, wherein:

the control circuit carries out controls so that the data table stored in the external data recording and reproducing apparatus may be changed, and the data table stores a plurality of ID data that a user can select on the data recording and reproducing apparatus, for predetermined ID items, and when the external data recording and reproducing apparatus records data the ID data selected by the user, of the plurality of ID data, is recorded as header information.

10. The apparatus according to claim 9, wherein the control circuit can change at least one of ID data identifying a user, ID data identifying a work type, option item data and an option item name, which are stored in the data table.

11. The apparatus according to claim 8, wherein when changing at least one of the control program and the control data, the control circuit causes the identification code acquisition circuit to acquire the identification code of the external data recording and reproducing apparatus again, and the control circuit determines whether the acquired identification code of the external data recording and reproducing apparatus is identical to the identification code of the external data recording and reproducing apparatus selected by the second selection circuit.

* * * * *